United States Patent
Sareyka et al.

(10) Patent No.: US 9,255,402 B2
(45) Date of Patent: Feb. 9, 2016

(54) HANGING LOAD SUPPORT

(71) Applicant: Worthington Armstrong Venture, Malvern, PA (US)

(72) Inventors: Brett Wayne Sareyka, Glen Mills, PA (US); Joshua Lee Neal, Elverson, PA (US)

(73) Assignee: Worthington Armstrong Venture, Malvern, PA (US)

( * ) Notice: Subject to any disclaimer, the term of this patent is extended or adjusted under 35 U.S.C. 154(b) by 0 days.

(21) Appl. No.: 14/120,104

(22) Filed: Apr. 25, 2014

(65) Prior Publication Data

US 2015/0308617 A1  Oct. 29, 2015

(51) Int. Cl.
*E04B 9/18* (2006.01)
*E04B 9/00* (2006.01)
*F16M 13/02* (2006.01)
*E04B 9/06* (2006.01)

(52) U.S. Cl.
CPC ............. *E04B 9/006* (2013.01); *E04B 9/067* (2013.01); *E04B 9/068* (2013.01); *E04B 9/18* (2013.01); *F16M 13/027* (2013.01)

(58) Field of Classification Search
CPC ............ E04B 9/18; E04B 9/127; E04B 9/20; E04B 9/00; E04B 9/006; E04B 9/068; E04B 9/067; F16M 13/067
USPC ............ 52/506.06, 506.07, 506.08, 664, 665, 52/220.6
See application file for complete search history.

(56) References Cited

U.S. PATENT DOCUMENTS

| | | | | |
|---|---|---|---|---|
| 2,868,490 | A | * | 1/1959 | Price ........................ 248/228.4 |
| 2,924,089 | A | * | 2/1960 | Reiland ......................... 52/710 |
| 2,942,704 | A | * | 6/1960 | Stubbs ........................ 52/476 |
| 3,067,323 | A | | 12/1962 | Kember |
| 3,599,921 | A | * | 8/1971 | Cumber ........................ 248/317 |
| 3,612,461 | A | | 10/1971 | Brown et al. |
| 3,677,589 | A | * | 7/1972 | Roles ........................... 403/217 |
| 4,025,019 | A | | 5/1977 | Jacobsen et al. |
| 4,062,519 | A | * | 12/1977 | Jacobs ......................... 160/331 |
| 4,073,458 | A | | 2/1978 | Sease |
| 4,081,931 | A | * | 4/1978 | Miyoshi ........................ 52/39 |
| 4,191,352 | A | | 3/1980 | Schuplin |
| 4,434,599 | A | * | 3/1984 | McCall ..................... 52/506.07 |
| 4,640,077 | A | | 2/1987 | Hall |
| 5,259,165 | A | * | 11/1993 | Koyama ..................... 52/506.06 |

(Continued)

FOREIGN PATENT DOCUMENTS

| | | | | |
|---|---|---|---|---|
| DE | 1053166 | B | * 3/1959 | ............. E04B 9/18 |
| EP | 0652338 | | 5/1995 | |

(Continued)

OTHER PUBLICATIONS

International Search Report and Written Opinion issued in counterpart application PCT/US2015/027485 dated Jun. 30, 3015.

*Primary Examiner* — Adriana Figueroa
*Assistant Examiner* — Jessie Fonseca
(74) *Attorney, Agent, or Firm* — Stradley Ronon Stevens & Young, LLP (57) ABSTRACT

A system for supporting loads from a support structure. The load is supported with threaded rods that are connected from above and below a suspended ceiling of roll-formed sheet metal beams. Clips on the rods connected to the beams pass the load through the suspended ceiling grid without bending or twisting the grid, so that the suspended ceiling remains level, balanced, and intact above the suspended load.

10 Claims, 6 Drawing Sheets

(56) References Cited

U.S. PATENT DOCUMENTS

| | | | |
|---|---|---|---|
| 5,313,759 A | 5/1994 | Chase, III | |
| 5,979,055 A | 11/1999 | Sauer et al. | |
| 6,138,416 A | 10/2000 | Platt | |
| 6,464,179 B1 | 10/2002 | Bulvan et al. | |
| 6,523,313 B2 | 2/2003 | Lin et al. | |
| 6,763,642 B2 | 7/2004 | Platt | |
| 7,260,919 B1 * | 8/2007 | Spransy et al. | 52/586.1 |
| 7,614,195 B2 | 11/2009 | Platt et al. | |
| 7,886,496 B1 * | 2/2011 | Spransy | 52/506.06 |
| 2003/0213199 A1 * | 11/2003 | Bongio et al. | 52/506.01 |
| 2009/0255203 A1 * | 10/2009 | Richardson et al. | 52/506.06 |
| 2012/0240495 A1 | 9/2012 | Eychaner et al. | |
| 2013/0330043 A1 | 12/2013 | Goldsmith et al. | |

FOREIGN PATENT DOCUMENTS

| | | | | |
|---|---|---|---|---|
| FR | 2922237 A1 * | 4/2009 | | E04B 9/068 |
| JP | H11-149250 | 6/1999 | | |

* cited by examiner

HANGING LOAD SUPPORT

BACKGROUND OF THE INVENTION

1. Field of the Invention

The invention relates to prior art suspended ceilings that use beams roll-formed of sheet metal in a grid that supports relatively light weight loads, such as panels. The beams have an inverted T-cross section with a vertical web, horizontal flanges extending opposite from one-another at the bottom of the web, and a bulb at the top, and optionally along, the web. Such beams are interconnected into a grid having rectangular openings that support panels on the flanges of the beams. The grid is supported from an overhead structure by hang wires. In some instances, the grid supports other light loads, such as signs, or other visual decorative elements.

2. Description of Related Art

Relatively light roll-formed sheet metal beams of the type described above and used in the present invention are shown, for instance, in U.S. Pat. Nos. 5,979,055 and 6,138,416. Such light beams are arranged into a grid, as shown, for instance, in U.S. Patent 6,763,642.

Such suspended ceilings, with such relatively light sheet steel roll-formed metal grid beams that support panels, provide a pleasing cover over a room, with a minimum use of metal in the grid beams, since such a suspended ceiling structurally is designed to support only itself.

In some instances, however, light weight loads, for instance light fixtures, are hung below a suspended ceiling from the suspended ceiling grid by a clip on the ceiling grid, as shown for instance, in U.S. Pat. No. 3,612,461. In U.S. Pat. No. 4,073,458, there is shown a hanger clip for displaying light weight articles, such as sale signs, from a suspended ceiling. However, where it is necessary to support relatively heavy loads, such as data banks, below a suspended ceiling, heavy forged metal beams are used in the prior art in the ceiling grid of the suspended ceiling, instead of the light roll-formed sheet metal beams described above. The prior art forged steel beams have threads in channels in the beams, that receive threaded rods, as seen for instance in U.S. Patent Publication 2012/0240495A1 published Sep. 27, 2012.

SUMMARY OF THE PRESENT INVENTION

In the present invention, a prior art suspended ceiling having a grid of roll-formed sheet metal grid beams, as described above, is adapted to transmit relatively heavy loads from below the suspended ceiling to a structural support above the suspended ceiling.

Threaded load and hang rods, are secured to the suspended ceiling grid formed of prior art roll-formed sheet metal grid beams by clips shaped to transmit loads vertically through the webs of the grid beams, without twisting or bending the beams in the grid. The load and hang clips are spaced on the suspended ceiling at locations that maintain a level and balanced suspended ceiling, notwithstanding the relatively heavy loads that are being supported through the suspended ceiling by means of the clips, and the threaded rods secured to the clips.

The invention uses a prior art grid of beams of sheet metal that are roll-formed into an inverted T cross section. The suspended ceiling grid formed from these roll-formed sheet metal grid beams is suspended from a structural support, such as a structural ceiling, by hang wires. Panels are placed in rectangular grid openings formed by the grid, in the suspended ceiling.

In the present invention, relatively heavy loads, such as data banks, are suspended through such prior art suspended ceilings formed of roll-formed sheet metal beams described above, without the need to use heavy forged metal beams in the grid as described above. Lower threaded load rods are secured to the grid beams with grid beam load clips in a manner that passes the loads solely vertically upward through the webs of the grid beams to grid beam hang clips, at selected ceiling locations on the grid, above the suspended ceiling. The grid beam hang clips receive and pass the load through the suspended ceiling to upper threaded rods, above the suspended ceiling, that are secured into the upper structural support, such as a structural ceiling.

In this way, the load hung below the suspended ceiling passes upwardly only through the webs of the grid beams, without twisting or bending the beams. The grid beam hang clips above the ceiling are spaced on the web to balance the load from the grid beam load clips below the ceiling, and are designed to avoid any twisting or bending of the relatively fragile roll-formed sheet metal grid beams.

DETAILED DESCRIPTION OF THE INVENTION

Figure 1:
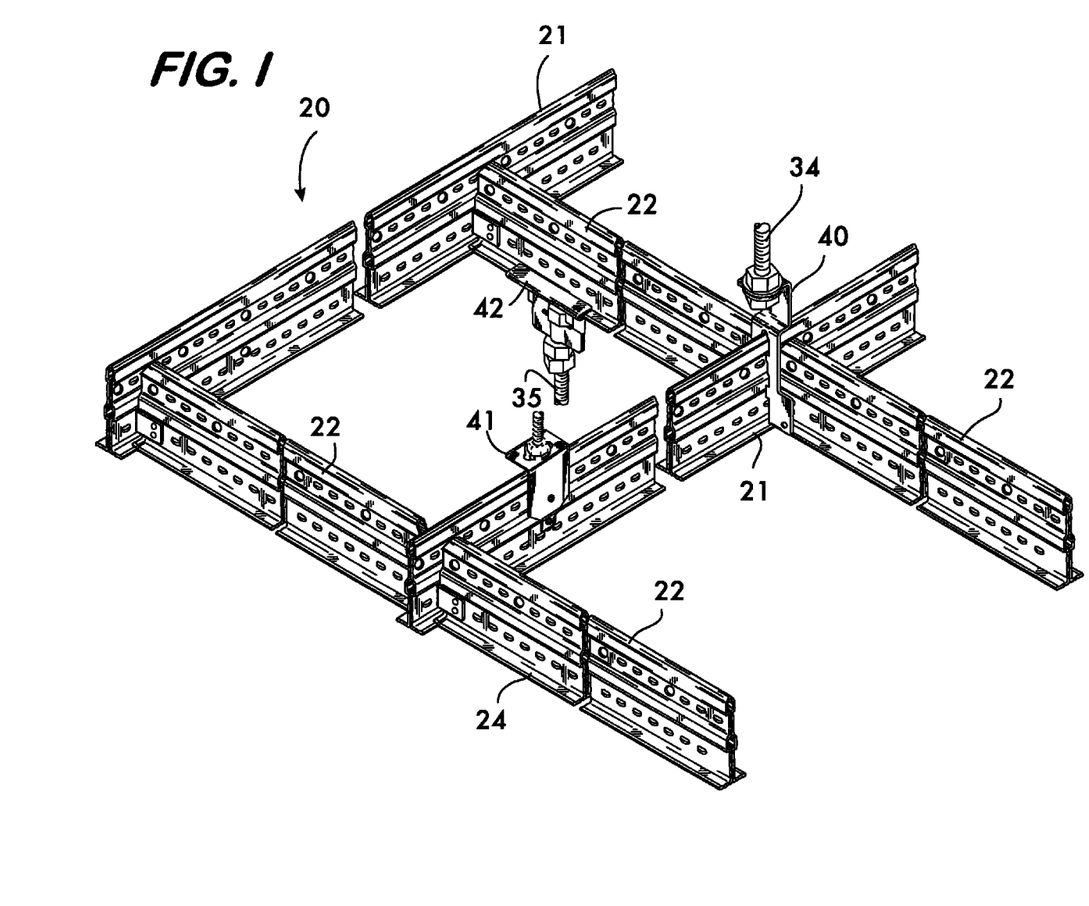
FIG. 1 is an isometric view of a suspended ceiling of the invention using grid beam load clips below the suspended ceiling, and grid beam hang clips above the suspended ceiling, to transmit loads through the suspended ceiling to a structural support.

In FIG. 1, there is shown a well-known type of prior art suspended ceiling grid 20 formed of interlocking main beams 21 and cross beams 22 suspended from a structural support. Both the main beam 21, and the cross beams 22 have the same cross section, which includes a web 25, horizontal flanges 26, 27 extending in opposite directions from the bottom of the web 25, and bulbs 30, 31 at the top of, and along, the web 25. Suitable connectors, as seen for instance in prior art U.S. Pat. Nos. 6,523,313, and 7,614,195, connect the grid cross beams 22, and the main beams 21, to form a suspended ceiling grid 24 with rectangular openings 32. Panels 33 are supported in the suspended ceiling grid openings 32 to cover the space below the suspended ceiling 20. The space above the suspended ceiling 20 may be used for air ducts, electrical conduits, sprinkler systems, and other structures, that are supported from the structural support above the suspended ceiling 20.

Examples of such prior art ceiling grids are shown in detail, for instance, in the above cited '642 U.S. patent, incorporated herein by reference.

The suspended ceilings 20 of the present invention have lower threaded load rods 35 and upper threaded hang rods 34 that are connected to the suspended ceiling grid beams 21, 22 below and above the suspended ceiling 20. The upper threaded hang rods 34 are located at places in the ceiling grid 24 that counterbalance the loads imparted to the grid 24 by the lower threaded load rods 35, which are located above the loads below the suspended ceiling 20 being supported in basket 61. Such placement of the upper threaded hang rods 34 avoids any bending, twisting, or unbalancing of the suspended ceiling grid 24 when such a load below the suspended ceiling 20 is supported through the suspended ceiling 20 from a structural support.

The lower threaded load rods 35 and upper threaded hang rods 34 are attached to the grid beams 21, 22 with clips 40, 41, and 42.

Figure 9:
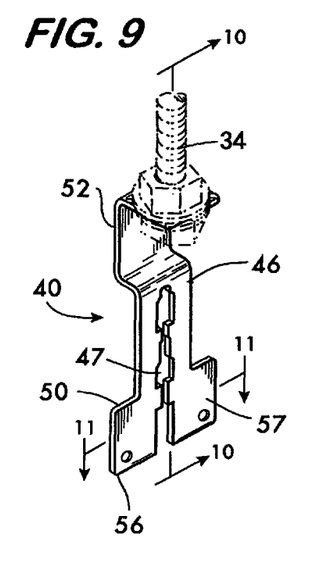
FIG. 9 is an isometric view of a grid beam intersection hang clip of the invention straddling a grid main beam from above, and secured to grid cross beams, at an intersection of a grid main beam and grid cross beams.
Figure 10:
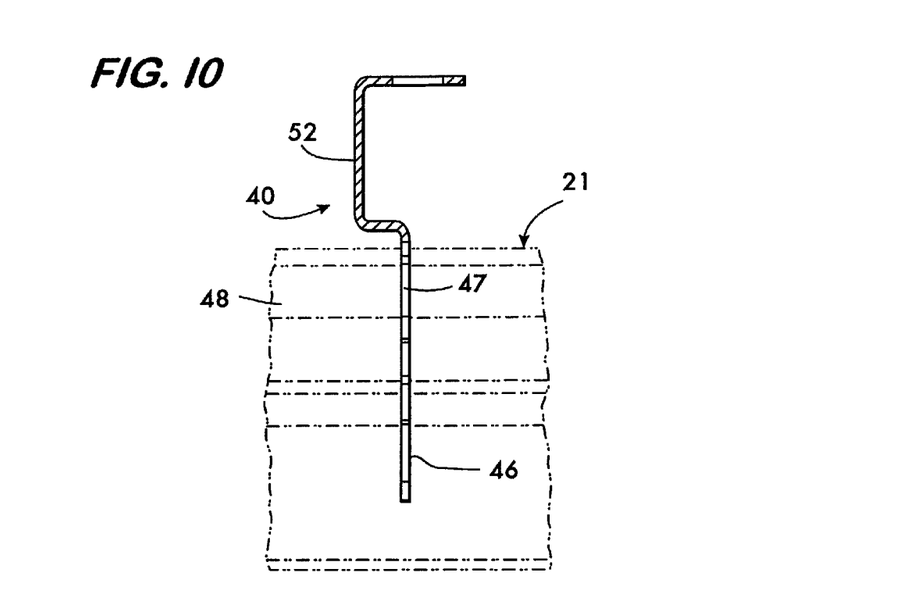
FIG. 10 is a sectional side view of the grid beam intersection hang clip of FIG. 9 taken on the line 10-10 of FIG. 9, secured to a grid main beam, which is shown in phantom.
Figure 11:
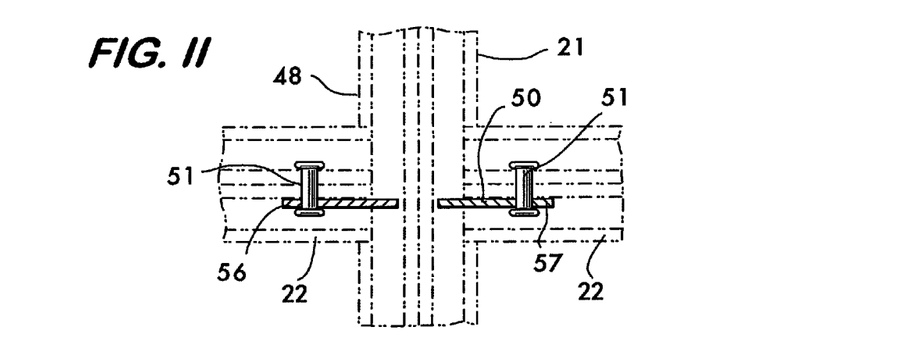
FIG. 11 is a sectional view of the grid beam intersection hang clip of FIG. 9, taken on the line 11-11, showing the intersection hang clip straddling a main beam, and attached to cross beams.

A grid beam intersection hang clip 40 is placed above grid 24 at a desired location, based on the location of the grid beam load clips 42 described below, at an intersection of a main beam 21 and a pair of cross beams 22. The grid beam intersection hang clip 40, as seen particularly in FIG. 9, has a first lower portion 46 that has a cutout 47 that straddles a grid main beam 21 cross section 48, and a second lower portion 50 that is secured to the adjoining grid cross beams 22, by rivets 51, as seen in FIG. 11. The grid beam intersection hang clip 40 has an offset at the top 52 so that the line of support from a threaded rod 34 passes downward through the cutout 47 that straddles the main beam 21, thus preventing any torsion stresses on the main beam 21.

As seen particularly in FIG. 11, the wings 56, 57 at the bottom of the grid beam intersection hang clip 40 are secured by rivets 51 to the cross beams 22 to increase load carrying capabilities of both clip 40 and cross beams 22.

Figure 7:
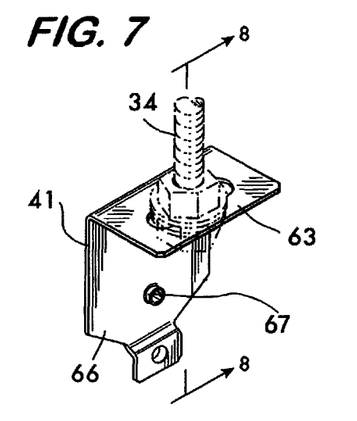
FIG. 7 is an isometric view of a grid beam hang clip of the invention used to secure an upper threaded rod to the grid beam in a way that receives the load vertically solely through the web of the grid beam.
Figure 8:
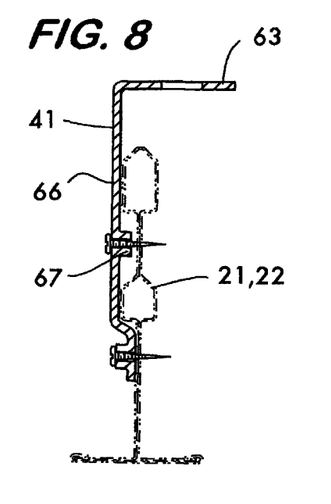
FIG. 8 is a sectional view taken on the line 8-8 of the grid beam hang clip of FIG. 7, showing the grid beam hang clip attached to a grid beam in the grid, to pass the load through the web of the grid beam, without bending or twisting the beams.

Also connected to the suspended ceiling grid 24 from the structural support, are upper threaded hang rods 34 connected at their lower end to either a main beam 21 or cross beams 22, at a desired location, by the grid beam hang clip 41 shown in FIGS. 7 and 8. Such grid beam hang clip 41, used to suspend the grid 24 by upper threaded hang rod 34 above the suspended ceiling 20, has a contour in cross section that includes a top arm 63 that receives the upper threaded hang rod 34, a side profile 66 that follows that of a grid beam 21, 22, and anchoring holes 67 that permit the grid beam hang clip 41 to be secured to grid beams 21, 22. The profiles of the clips 40, 41, are such that all vertical tensile forces pass through the web 25 of a grid beam 21, 22 without any torsion or twisting forces being created.

Below ceiling grid 24, grid beam load clips 42, as shown in FIGS. 1, 3 through 5, and 12, are used to pass the load upward through the webs of grid beams 21, 22, through grid beam intersection hang clips 40, and grid beam hang clips 41, to threaded load rods 35, without the beams 21, 22, of the grid 24, bending or twisting Grid beam load clips 42 are formed of two identical halves 68, 69 that slide together to lock onto the flanges 26, 27 of a grid beam 21, 22. In the exploded view of FIG. 4, the threaded load rod 35 is intended to be clamped between the identical halves 68, 69 and then locked in position with nut 58, so that loads, such as from the basket 61 pass upwards through the threaded load rods 35, and on through the webs 25 of the beams 21, 22, in grid 24 without creating twisting or torsion forces in the beams 21, 22, nor creating unbalance in grid 24 that would cause the grid to distort or fail.

Figure 2:
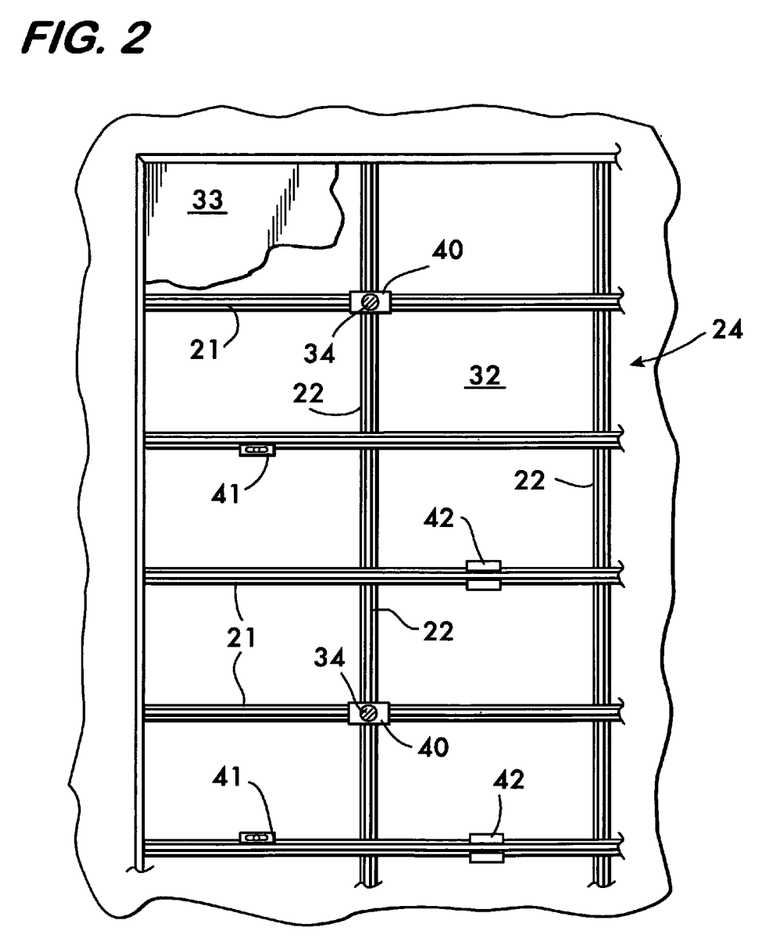
FIG. 2 is a view downward showing the spacing of the grid beam load clips and grid beam hang clips of the invention on the grid beams, to secure a balanced load through the ceiling.
Figures 3, 4, 5:
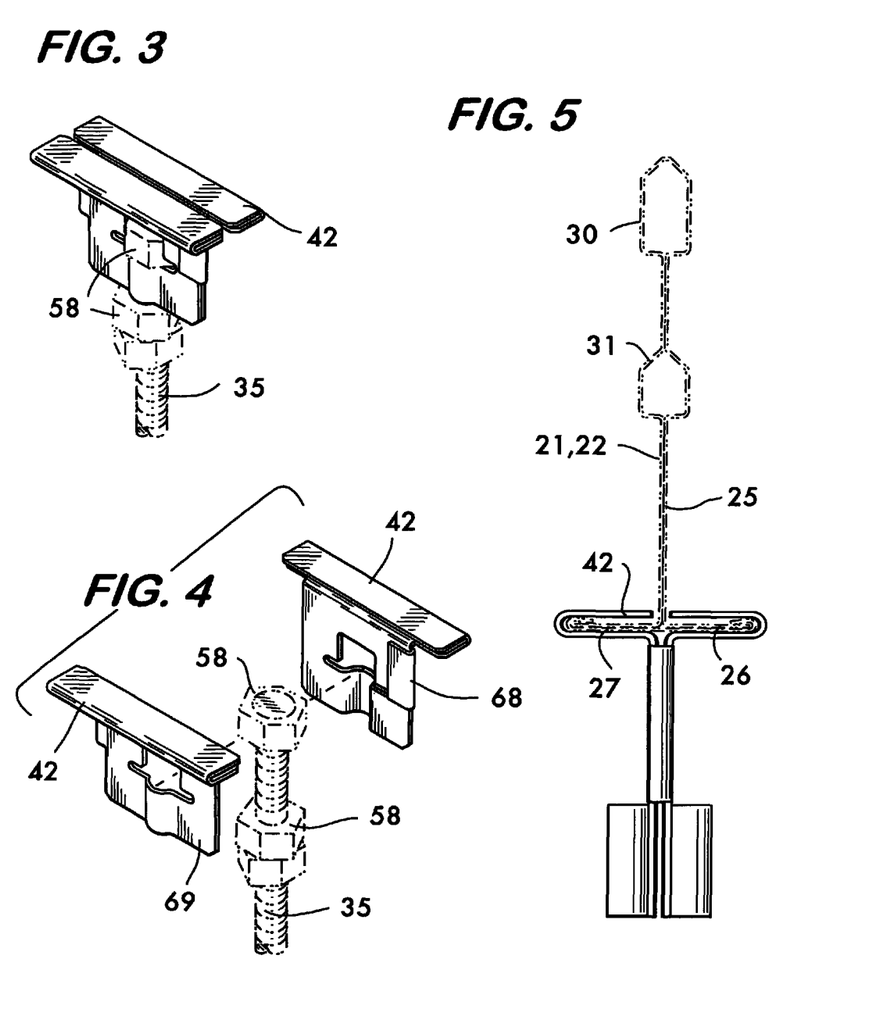
FIG. 3 is a downward isometric view of a grid beam load clip of the invention that is secured to a grid beam from below the suspended ceiling.
FIG. 4 is an exploded view of the grid beam load clip of FIG. 3.
FIG. 5 is a cross-section view of the grid beam load clip of FIGS. 3 and 4 secured to the flanges of a grid beam in a suspended ceiling grid, which is shown in phantom.
Figure 6:
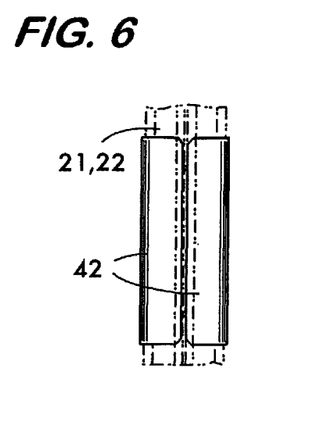
FIG. 6 is a view downward showing the grid beam load clip of FIG. 3 secured to a grid beam, shown in phantom, in a suspended ceiling grid.
Figure 12:
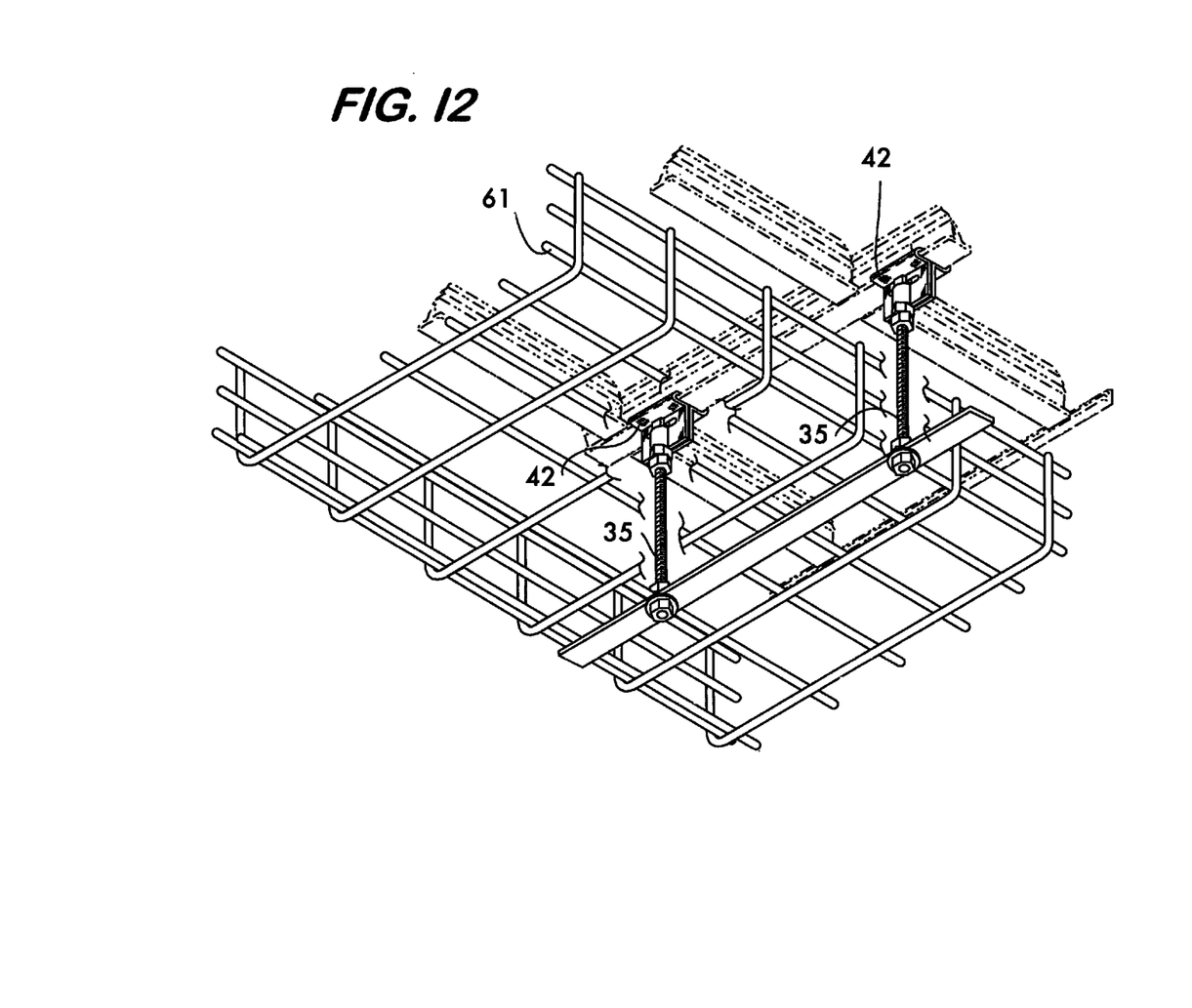
FIG. 12 is a partial perspective view of a basket supported from a structural support through a suspended ceiling.

The lower grid beam load clips 42 are spaced above the basket 61, as seen in FIGS. 2 and 12, which carries the load below the suspended ceiling 20. The upper grid beam intersection hang clips 40, and the grid beam hang clips 41, are spaced, for instance, as shown in FIGS. 1 and 2. Such a clip 40, 41, 42 arrangement as shown in FIG. 2 is for illustrative purposes only, since the positioning of the upper grid beam hang clips 40, grid beam hang clips 41 will generally first be determined by the location of the load supported in basket 61 shown in FIG. 12. The upper grid beam intersection hang clips 40, and grid beam hang clips 41, are positioned at the grid beam intersections and along the beams 21, 22, at the appropriate places, as described above, to create a balanced suspended ceiling 20 wherein the load below the suspended ceiling 20 is passed through the webs 25 of the grid beams 21, 22 of the suspended ceiling 20 without creating distortions in, or collapse of, the suspended ceiling grid 24, whereby the suspended ceiling 20 remains level, balanced and intact.

Initially, the positioning of the lower grid beam load clips 42 will be determined by the position of the load supported in basket 61.

Then, the positioning of the upper grid beam intersection hang clips 40 and upper grid hang clips 41, may be determined with respect to the positions of the lower grid beam load clips 42, both in number and location, so that there will be no twisting or unbalancing loads on the relatively fragile grid beams 21, 22 of the suspended ceiling 20, when the load in basket 61 is being supported. Foremost in such positioning of clips 40, 41, 42, is that such positioning results in the loads being transmitted through the webs 25 in the grid beams 21, 22 of the suspended ceiling grid 24, without creating twisting or torsion loads on such beams 21, 22, thus unbalancing the suspended ceiling 20.

As seen, for example, in the partial view of a suspended ceiling 20 in FIG. 2, grid beam intersection hang clips 40 and grid beam hang clips 41 balance out the load on the suspended ceiling 20 from grid beam load clips 42, so that the suspended ceiling 20 remains level, balanced, and intact, with a minimum of twisting or torsion loads on the grid beams 21, 22.

What is claimed is:
1. A suspended ceiling comprising:
a grid of beams below a structural support, each of the beams being made of roll-formed sheet metal and having an inverted T cross section having a vertical web having a top and a bottom, horizontal flanges-extending opposite from one another at the bottom of the vertical web, and at least one bulb at the top of the vertical web;
a first upper threaded hang rod above the grid of beams secured into the structural support and secured to the grid of beams by a first hang clip comprising:

a lower portion including a cutout which straddles a main beam of the grid of beams at the intersection of the main beam and a pair of opposing cross beams of the grid of beams;

a first wing attached to a bottom of the lower portion on a first side of the main beam, the first wing secured to a first cross beam of the pair of opposing cross beams by a first rivet;

a second wing attached to a bottom of the lower portion on a second side of the main beam opposite the first side, the second wing secured to a second cross beam of the pair of opposing cross beams by a second rivet; and a top portion attached to the lower portion, the upper threaded hang rod being inserted into the top portion and secured to the top portion by a first nut and a second nut, wherein the top portion has an offset so that the upper threaded hang rod is in-line with the cutout, thereby preventing torsion stresses on the main beam;

a lower threaded load rod below the grid of beams, the lower threaded load rod secured to the grid of beams by a load clip; and a load below the grid of beams supported by the lower threaded load rod;

wherein the lower threaded load rod and the upper threaded hang rod enable tensile forces applied to the grid of beams by the load to pass through the grid of beams to the structural support without creating torsion or twisting forces in the grid of beams.

2. The suspended ceiling of claim 1, wherein the suspended ceiling remains balanced, level, and intact even though the load below the grid of beams is not spread evenly over the grid of beams.

3. The suspended ceiling of claim 1, wherein the first hang clip and the load clip transmit the tensile forces to and from the grid beams without bending or twisting.

4. The suspended ceiling of claim 1, wherein the load clip and the first hang clip grip the beams without weakening the beams.

5. The suspended ceiling of claim 1, wherein the load clips comprises:
   a first half;
   a second half in contact with the first half to lock onto the horizontal flanges of a beam of the grid of beams, wherein a portion of the lower threaded load rod is clamped between the first half and the second half;
   a first nut on the lower threaded load rods above the clamped portion; and
   a second nut on the lower threaded load rod below the clamped portion to lock the lower threaded load rod in position.

6. The suspended ceiling of claim 1, further comprising a second upper threaded hang rod above the grid of beams secured into the structural support and secured to the grid of beams by a second hang clip comprising:
   a side profile that follows a profile of one of the beams;
   an anchoring hole in the side profile allowing the hang clip to be secured to the one of the beams;
   a top arm attached to the side profile, the top arm receiving the second upper threaded hang rod, the second upper threaded hang rod secured to the top arm by a first nut and a second nut.

7. The suspended ceiling of claim 1, wherein:
the load clip includes:
   a first half,
   a second half in contact with the first half to lock onto the horizontal flanges of a beam of the grid of beams, wherein a portion of the lower threaded load rod is clamped between the first half and the second half,
   a first nut on the lower threaded load rods above the clamped portion; and
   a second nut on the lower threaded load rod below the clamped portion to lock the lower threaded load rod in position; and
the suspended ceiling further comprises a second upper threaded hang rod above the grid of beams secured into the structural support and secured to the grid of beams by a second hang clip including:
   a side profile that follows a profile of one of the beams,
   an anchoring hole in the side profile allowing the second hang clip to be secured to the one of the beams, and
   a top arm attached to the side profile, the top arm receiving the second upper threaded hang rods, the second upper threaded hang rod secured to the top arm by a first nut and a second nut.

8. The suspended ceiling of claim 1, wherein the load comprises a basket.

9. The suspended ceiling of claim 1, wherein the grid of beams includes a plurality of rectangular openings and the grid of beams supports a plurality of panels in the plurality of rectangular openings.

10. The suspended ceiling of claim 1, wherein the grid of beams does not include forged metal beams.

* * * * *

UNITED STATES PATENT AND TRADEMARK OFFICE
CERTIFICATE OF CORRECTION

PATENT NO. : 9,255,402 B2  
APPLICATION NO. : 14/120104  
DATED : February 9, 2016  
INVENTOR(S) : Sareyka et al.

It is certified that error appears in the above-identified patent and that said Letters Patent is hereby corrected as shown below:

Claims

Claim 1, Col. 4, line 62: "flanges-extending" should read "flanges extending";

Claim 5, Col. 5, line 42: "the load clips comprises" should read "the load clip comprises"; and Claim 5, Col. 6, line 1: "the lower threaded load rods" should read "the lower threaded load rod.".

Signed and Sealed this  
Twenty-eighth Day of June, 2016

Michelle K. Lee  
*Director of the United States Patent and Trademark Office*